April 28, 1953 G. T. LEATHERMAN 2,636,912
DEHYDROFLUORINATION OF HYDROCARBONS
Filed July 29, 1949
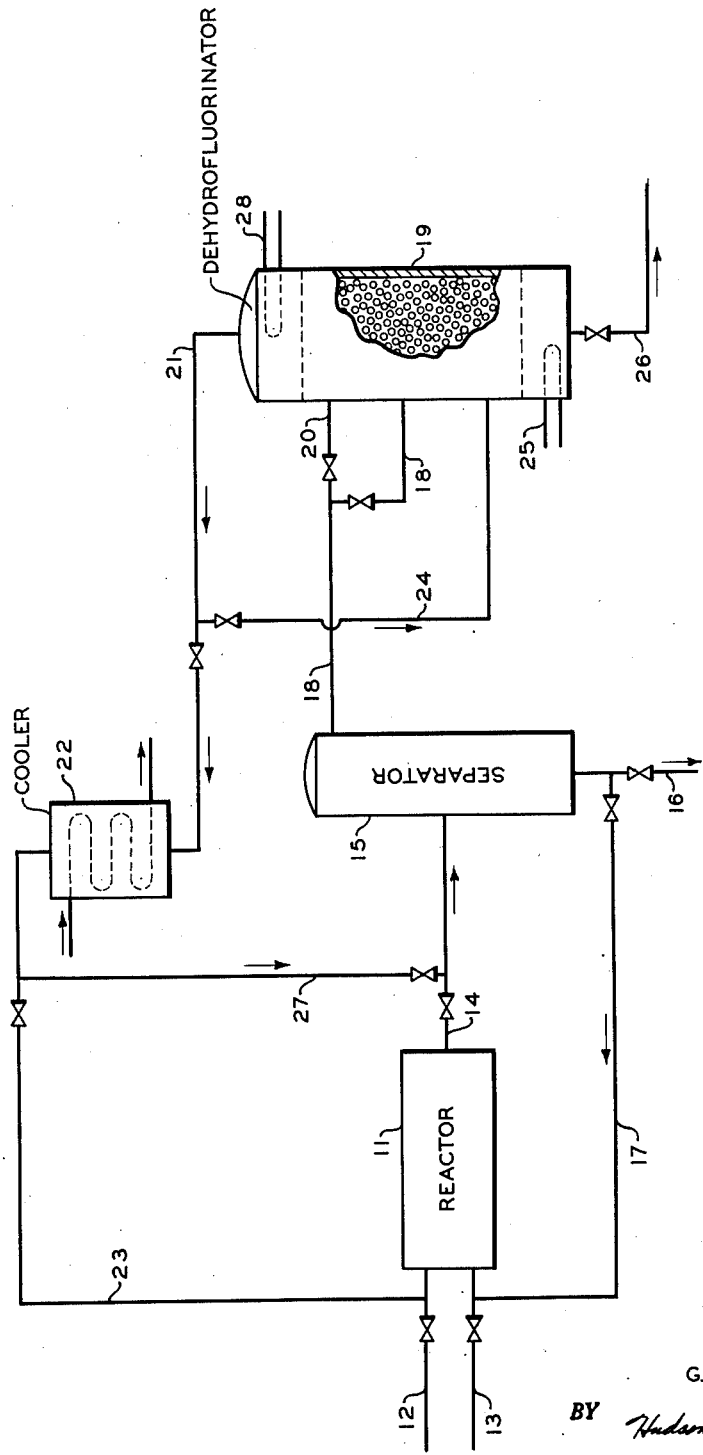
INVENTOR.
G. T. LEATHERMAN
BY Hudson and Young
ATTORNEYS Patented Apr. 28, 1953

2,636,912

UNITED STATES PATENT OFFICE 2,636,912

DEHYDROFLUORINATION OF HYDROCARBONS

Gerald T. Leatherman, Bartlesville, Okla., assignor to Phillips Petroleum Company, a corporation of Delaware Application July 29, 1949, Serial No. 107,585

8 Claims. (Cl. 260—683.15)

This invention relates to the treatment of organic materials to remove therefrom organic fluorine-containing compounds. In one of its more specific aspects, it relates to the removal from hydrocarbon materials of fluorine-containing compounds. In another of its more specific aspects, it relates to the removal of at least a major portion of organically bound fluorine from hydrocarbon materials containing organically bound flourine in an amount not greater than 1 per cent by weight and often in an amount not greater than between 0.1 and 0.05 per cent by weight.

In the manufacture of hydrocarbons by processes in which fluorine-containing catalysts are used, small proportions of organic fluorine-containing by-products are formed. These processes may involve reactions such as polymerization, alkylation, and isomerization of relatively low boiling hydrocarbons to produce motor fuel hydrocarbons in the presence of catalysts comprising one or more of such fluorine compounds as hydrofluoric acid, boron trifluoride, and the like. Although the exact nature or composition of the organic fluorine-containing by-products which may be formed has not been definitely established, they are believed to be predominantly alkyl and/or aryl fluorides. Such fluorides are not completely removed by washing the hydrocarbons with alkali solutions. They tend to decompose at elevated temperatures, such as those employed in fractional distillation of the hydrocarbons, thereby forming hydrofluoric acid, which is corrosive, especially in the presence of moisture. In gases, they may thus cause corrosion of handling equipment; in liquid motor-fuel hydrocarbons, they are undesirable for reasons that are obvious.

Organic fluorine compounds have conventionally been removed from hydrocarbon material containing them by contacting such hydrocarbon materials with solid porous contact material. Contact materials which have heretofore been found suitable include those known to be catalytically active for hydrogenation or dehydrogenation reactions, such as alumina gel, activated alumina, dehydrated bauxite, chromium oxide, mixtures of alumina and chromium oxide, zirconia, limonite (ferric oxide), calcium oxide, magnesium oxide, and the like, metals of the iron group, especially finely divided nickel deposited on an inert support, and the like, and also such agents as porous, adsorptive, activated charcoal. Such contact materials appear to adsorb preferentially the organic fluorine compounds, although the exact mechanism involved is not fully known at present, and the fluorine remains bound with, or associated with, the contact material. The hydrocarbon material being treated may be in either the liquid or the vapor phase. Removal of the organic fluorine compounds in this manner has proved to be quite expensive because of the loss of considerable amounts of hydrogen fluoride. When dehydrated bauxite is used as the contact material, considerable expense has also been encountered because of the cost of the bauxite which is ordinarily discarded after it has adsorbed its maximum quantity of the organic fluorine compounds. Most of the processes for removing the organic fluorine which have heretofore been utilized have been batch processes. Batch processes, as is readily understood, are ordinarily quite expensive.

I have now found that organic materials containing such organic fluorine-containing compounds can be treated by a continuous process in the presence of nonadsorptive carbon to effect decomposition of such organic fluorine compounds. The carbon, which has a surface area of between 0.01 and 5 square meters per gram, as determined by low temperature gas adsorption tests, acts as a true catalyst which promotes the decomposition of the organic fluorine compounds and makes possible concomitant recovery of a major portion of the hydrogen fluoride resulting from the decomposition of the organic fluorine compounds. The organic fluorine compounds are removed from the hydrocarbon materials and are converted to hydrogen fluoride and light hydrocarbon materials in a continuous process. The catalysis is promoted when a minor amount of hydrofluoric acid is present during the dehydrofluorination step. When hydrofluoric acid is utilized to promote the catalysis, between 0.1 and 1 weight per cent of hydrofluoric acid may be present in the distillation zone with the organic fluorine contaminated hydrocarbon material.

This invention is performed by packing a fractional distillation tower with nonadsorptive carbon aggregate and passing a feed stream containing organic fluorine compounds therethrough to effect a decomposition of the organic fluorine compounds to free hydrogen fluoride. The nonadsorptive carbon which I use has a surface area of between 0.01 and 5 square meters per gram, preferably between 0.2 and 1 square meter per gram. Such carbon material is to be contrasted with commercially available activated adsorptive carbon which has a surface area of between 500 and 2000 square meters per gram. The hydrogen fluoride materials, together with low-boiling gaseous hydrocarbon materials, are removed from the upper portion of the fractional distillation chamber and the hydrogen fluoride is separated from the hydrocarbon materials.

My invention can be applied with particular advantage to the removal of fluorine compounds from effluents of a hydrocarbon conversion process wherein hydrofluoric acid has been employed as a conversion catalyst, either alone or with a promoter such as boron trifluoride, or the like. In the practice of the process of my invention, hydrocarbon effluents of the conversion process, such as an alkylation of an isomerization process, are passed from a catalyst separator to fractional distillation means. In this form, the hydrocarbon effluents will have associated with them relatively minor amounts of hydrogen fluoride and of organic fluorine compounds. When such hydrocarbon effluents are in the liquid phase, as generally will be the case, these fluorine compounds will be present more or less completely therein as dissolved constituents, although an additional small amount of entrained hydrofluoric acid will sometimes be included. The fractional distillation means will remove, as a low-boiling product, a hydrogen fluoride fraction. Generally this fraction will also contain a low-boiling paraffin hydrocarbon, such as propane, a butane, or the like, in an amount at least sufficient to form with the hydrogen fluoride a low-boiling azeotropic mixture.

An object of this invention is to effect substantially complete removal of fluorine from hydrocarbon fluids containing organic fluorine compounds as impurities. Another object of the invention is to provide an improved continuous process for obtaining a substantially fluorine-free alkylate from the alkylation of hydrocarbons in the presence of a catalyst comprising a fluorine compound. Another object of the invention is to remove organic fluorine compounds from other organic materials. Another object of the invention is to catalytically decompose organic fluorine compounds so as to release hydrogen fluoride. Another object of the invention is to effect a simultaneous removal of hydrogen fluoride and organic fluorine compounds from low boiling hydrocarbon materials which contain such fluorine compounds as impurities. Other and further objects and advantages will be apparent, to those skilled in the art, upon study of the accompanying disclosure and discussion.

The drawing schematically portrays a flow plan and apparatus by which the process of this invention is readily carried out.

Referring now to the drawing, a suitable hydrocarbon material is charged to reactor chamber 11 through conduit 12. Hydrofluoric acid is charged to the reactor as a catalyst for the reaction within reactor 11 through conduit 13. As previously discussed, the invention can be applied to the effluents of any one of a number of processes. Generally, however, the invention will be applied to paraffinic hydrocarbon effluents of an alkylation process or of an isomerization process. When the process is one of alkylation, the hydrocarbon charge will comprise a mixture of paraffins and olefins and the reaction conditions maintained in the reactor will be those well known to the art. When the process is one for isomerization of paraffin hydrocarbons, the hydrocarbon charge will comprise paraffins to be isomerized and the reaction conditions will be somewhat similar to those known for alkylation so far as temperature, pressure, and contact time are concerned. In either event, hydrogen fluoride may be the essential catalyst and if desired may be promoted by from about 1 to about 10 per cent by weight of boron trifluoride.

Effluent material from reactor 11 is passed by means of conduit 14 into separator chamber 15. A hydrofluoric acid phase is formed in the lower portion of the separator chamber 15 and a hydrocarbon phase, generally in a liquid state and containing organic fluorine compounds is formed in the upper portion of the separator. Hydrofluoric acid is removed from the lower portion of separator 15 through conduit 16. A portion of the hydrofluoric acid may be recycled to reactor 11 through conduit 17. Hydrocarbon material containing organic fluorine compounds is removed from the upper portion of separator 15 through conduit 18 and is passed into dehydrofluorinator 19 by way of conduits 18 and 20. Dehydrofluorinator 19 is packed with a nonadsorptive carbon aggregate material which may be in the form of Raschig rings or in the form of pellets of any other desirable shapes such as are used for packing in fractional distillation columns. Dehydrofluorinator 19 is maintained at distillation conditions of temperature and pressure. It is generally desirable to maintain the temperature within the dehydrofluorinator within the range of from 150° F. to 300° F., the temperature being graduated from the bottom or kettle portion of the chamber to the upper or head portion of the chamber. Best operation is obtained when maintaining the kettle temperature of the dehydrofluorinator within the range of between 200° F. and 300° F. The organic fluorine material is decomposed in the presence of the nonadsorptive carbon catalyst and is removed from the upper portion of dehydrofluorinator 19 in the form of hydrogen fluoride and gaseous low boiling hydrocarbon material.

Dehydrofluorinator 19 is operated in such a manner that hydrogen fluoride and any boron trifluoride and the like, if such has been used, is removed by distillation as a low boiling fraction, generally accompanied by at least a sufficient amount of a low boiling paraffin hydrocarbon to form a low boiling azeotropic mixture therewith. This low boiling fraction is removed, generally as a gaseous mixture, through conduit 21 and at least a major portion of it is passed through cooler 22 in which the material is cooled and condensed. The condensed material can then be passed by means of conduit 23 to conduit 12 and reactor 11, or through conduit 27 to conduit 14 and separator 15. A minor portion of the gaseous mixture may be removed from conduit 21 by means of conduit 24 and passed to a point in the lower portion of dehydrofluorinator 19, preferably at or near the bottom of the dehydrofluorination zone which is associated with the distillation zone. This minor portion of gaseous mixture passes upwardly through the dehydrofluorination zone and promotes the reaction therein. In a preferred embodiment of the invention the material which is removed from separator 15 through conduit 18 is passed as a liquid to the upper portion of the fractional distillation zone as a combined feed and reflux stream, through conduits 18 and 20. Any material which is returned through conduit 24 to the lower portion of the dehydrofluorination zone is passed as a gaseous mixture to a point well below the point of introduction of the combined feed and reflux stream. This material comprising free hydrogen fluoride is introduced in an amount such that a concentration of free hydrogen fluoride at the point of introduction is generally not in excess of 1 per cent by weight of free hydrogen fluoride in the resulting mixture.

Although the invention has been described in connection with the step of supplying free hydrogen fluoride to the dehydrofluorination zone, conversion of the organic fluorine materials is also accomplished quite economically without the use of the free hydrogen fluoride. The activity of the nonadsorptive carbon as the sole catalyst is such that a major portion of the organic fluorine material is continuously converted to hydrogen fluoride and low boiling gaseous hydrocarbon material.

Heat is supplied to dehydrofluorinator 19 by means of suitable heating equipment illustrated by heating coil 25. Satisfactory operation is generally obtained with a temperature at this point of between 200° F. and 300° F. as disclosed above. Temperatures higher than the upper part of this range or lower than the low part of this range may be used in some instances. Excessive time is ordinarily required to obtain satisfactory removal of the organic fluorine, however, if lower temperatures are used and excessively high pressures are encountered in connection with the distillation if higher temperatures are used. If desired, or necessary, cooling and reflux at the top of dehydrofluorinator 19 can be obtained by conventional equipment, illustrated by cooling coil 28.

Best conversion is effected when dehydrofluorinator 10 is operated at an overall space velocity (liquid volume of hydrocarbon/volume of catalyst/hour) of between 1 and 3. Sufficient apparent carbon surface is provided in dehydrofluorinator 19 to contact between 0.0001 and 0.1, preferably between 0.003 and 0.03, barrel of feed for each apparent square foot of catalyst surface per hour. The overhead material from dehydrofluorinator 19, which is recycled to the reactor, generally constitutes between 20 weight per cent and 40 weight per cent of the feed thereto.

A high boiling liquid fraction which is free of hydrogen fluoride and also substantially free of organic fluorine compounds is removed as a kettle product from the lower portion of dehydrofluorinator 19 through conduit 26 and is passed to separating means, such as a fractionator, not shown. It will be obvious to those skilled in the art that the drawing schematically illustrates the use of conventional equipment which is not shown in detail and that considerable conventional equipment, such as heaters, coolers, condensers, reflux equipment, pumps, compressors, catalyst chambers, and the like, will be necessary in the practice of any specific embodiment of the invention and can be readily adapted thereto in the light of the teaching and discussion presented herein.

The following data are given to further illustrate and exemplify the invention. It will be understood that these data are exemplary only and are not to be construed as limiting broader embodiments of the invention.

Five routine tests were made relating to the invention disclosed in the discussion above. In four of the tests, free hydrogen fluoride was provided in amounts within the range disclosed hereinbefore, and in one of the tests carbon aggregate was utilized as the sole dehydrofluorination catalyst. In the first three tests, the feed was supplied to a dehydrofluorinator which had a column of 1⅜ inches inner diameter and which column was packed with ¼ inch carbon Raschig rings for a length of 8.75 feet, the carbon rings having a surface area of 0.5 square meter per gram. For the last two tests, the ¼ inch carbon rings were removed from the column and a pipe having an outer diameter of 0.54 inch was placed in the column. The space between the inserted pipe and the wall of the column was packed for a length of 8.75 feet with ½ inch carbon rings having the same surface area per gram as the smaller rings. Conditions and results of the tests are set forth below in Table I. The feed which was utilized in tests 1 and 2 is set forth below in Table II as feed 1. Feed 2 was utilized in test 3 and feed 3 was utilized in tests 4 and 5. The organic fluorine content of the feed used in each test is shown in Table I.

*Table I*

| Test | Temp. of Column, °F. | | Pressure, p. s. i. | Space Velocity, liq. vol. of feed/vol. catalyst space/hour | Org. F. wt., percent | | | Free HF Wt., percent | | | Percent Dehydrofluorination |
|---|---|---|---|---|---|---|---|---|---|---|---|
| | Head | Kettle | | | Feed | Overhead | Kettle | Feed | Overhead | Kettle | |
| 1 | 187 | 233 | 235 | 1.7 | 0.155 | 0.063 | 0.0021 | 0.27 | 87 | 0.003 | 99 |
| 2 | 190 | 234 | 234 | 1.7 | 0.024 | 0.011 | 0.0003 | 1.08 | 83 | 0.003 | 99 |
| 3 | 190 | 234 | 230 | 1.8 | 0.145 | 0.184 | 0.035 | 0 | 46 | 0 | 83 |
| 4 | 194 | 234 | 265 | 2.3 | 0.137 | 0.126 | 0.0238 | 0.44 | 56 | .008 | 88 |
| 5 | 194 | 234 | 265 | 2.2 | 0.0210 | 0.0196 | 0.0042 | 0.67 | 54 | 0.003 | 87 |

*Table II*

| Constituents | Feed | | |
|---|---|---|---|
| | 1 | 2 | 3 |
| Propane | 8.8 | 8.4 | 8.4 |
| Isobutane | 50.4 | 51.2 | 51.2 |
| Normal Butane | 21.5 | 21.4 | 21.4 |
| Heavier Hydrocarbon | 19.3 | 19.0 | 19.0 |

The above data show the effectiveness of nonadsorptive carbon as the sole catalyst in the conversion of the organic fluorine-containing compounds. The importance of a proper relationship of surface area to flow is also indicated by the above data. When the surface area of the catalyst, which was available to the reaction, was decreased about twenty-five fold the organic fluorine content of the kettle product increased about twelve and fourteen fold for both high and low contents of organic fluorine in the feed. The results also indicate the value of promoting the conversion by providing a minor amount of hydrogen fluoride to the dehydrofluorination zone. When for any reason the feed is free of hydrogen fluoride, a small amount of hydrogen fluoride, such as 0.1 weight per cent or less to 1 weight per cent or more, may be added to the feed.

This invention has the advantage that practically no migration of the catalyst from the dehydrofluorinator is encountered. The problem of migration of silicon through the equipment from silicon containing catalysts is obviated hereby. Little or no reduction of catalyst by operation of the system is encountered with the nonadsorptive catalyst. The economic advantage obtained thereby is thus quite great.

Other and further modifications will be apparent to those skilled in the art upon study of the accompanying disclosure and discussion. Such modifications are believed to be within the spirit and scope of the disclosure.

I claim:

1. In a process of reducing the content of organic fluorine present as an impurity in a hydrocarbon material by subjecting the hydrocarbon material to distillation in contact with a solid dehydrofluorination catalyst, the improvement which comprises using nonadsorptive carbon-aggregate as the sole dehydrofluorination catalyst.

2. In a process of reducing the content of organic fluorine present as an impurity in a hydrocarbon material by subjecting the hydrocarbon material to distillation in contact with a solid dehydrofluorination catalyst, the improvement which comprises using nonadsorptive carbon-aggregate as a dehydrofluorination catalyst.

3. A process of continuously reducing the content of organic fluorine present as an impurity in a hydrocarbon material which comprises the steps of passing said hydrocarbon material together with a minor amount of hydrofluoric acid through a nonadsorptive carbon-aggregate packed fractional distillation zone, said carbon having a surface area of between 0.01 and 5 square meters per gram; maintaining contents of said distillation zone under distillation conditions of temperature and pressure; removing a low-boiling gaseous mixture comprising free hydrogen fluoride and a low-boiling paraffin hydrocarbon from said distillation zone; and separating said hydrogen fluoride and said low-boiling paraffin hydrocarbon.

4. The process of claim 3, wherein said minor amount of hydrofluoric acid comprises between 0.1 and 1 weight per cent; the contents of said distillation zone are maintained at a distillation temperature of not more than 300° F.; and passing said hydrocarbon material and hydrogen fluoride through said distillation zone at an overall space velocity of between 1 and 3, inclusive.

5. A process of continuously reducing the content of organic fluorine present as an impurity in a hydrocarbon material without catalyst regeneration which comprises the steps of passing said hydrocarbon material through a nonadsorptive carbon-aggregate packed distillation zone at an overall space velocity of between 1 and 3, inclusive, said carbon having a surface area of between 0.01 and 5 square meters per gram; maintaining contents of said distillation zone at a distillation temperature of not more than 300° F.; converting said organic fluorine, in the presence of said carbon, to gaseous free hydrogen fluoride and gaseous low-boiling hydrocarbon; removing said hydrogen-fluoride and low-boiling hydrocarbon from said distillation zone; cooling and condensing a major portion of said gaseous mixture; and separating said hydrogen fluoride and said low-boiling hydrocarbon.

6. The process of claim 5, wherein said carbon has a surface area of between 0.2 and 1 square meter per gram.

7. The process of claim 5, wherein between 0.1 and 1 weight per cent of hydrofluoric acid is added to said distillation zone with said organic fluorine contaminated hydrocarbon material.

8. In a process for the conversion of hydrocarbons in the presence of a fluorine-containing catalyst, the improvement which comprises passing effluents of such a hydrocarbon conversion to a settling zone; removing from said settling zone liquid hydrocarbon material containing a relatively small amount of organic fluorine compounds as impurities; passing said material together with between 0.1 and 1 weight per cent of hydrofluoric acid through a fractional distillation zone, said distillation zone being packed with nonadsorptive carbon in the form of Raschig rings, said carbon having a surface area of between 0.2 and 1 square meter per gram; maintaining contents within said distillation zone at a temperature within the range of between 150° F. and 300° F.; converting said organic fluorine to hydrogen fluoride and gaseous low-boiling hydrocarbon in the presence of said carbon rings; removing said hydrogen fluoride and low-boiling hydrocarbons from said distillation zone and passing them to a separation zone; cooling and condensing said materials in said separation zone; separating said hydrogen fluoride and said low-boiling hydrocarbon; and removing from said distillation zone a high-boiling hydrocarbon fraction substantially free of hydrogen fluoride and organic fluorine compounds.

GERALD T. LEATHERMAN.

References Cited in the file of this patent

UNITED STATES PATENTS

| Number | Name | Date |
|---|---|---|
| 2,392,915 | Grosse et al. | Jan. 15, 1946 |